(12) United States Patent
Winter et al.

(10) Patent No.: US 11,911,973 B2
(45) Date of Patent: Feb. 27, 2024

(54) CONTROL CIRCUITRY COMPRISING AN ADJUSTABLE CAPACITOR

(71) Applicant: Fresenius Kabi Deutschland GmbH, Bad Homburg (DE)

(72) Inventors: Philipp Winter, Homberg (DE); Lars Michel, Rosbach v. d. Höhe (DE); Michael Schaefer, Friedberg (DE)

(73) Assignee: Fresenius Kabi Deutschland GmbH, Bad Homburg (DE)

(*) Notice: Subject to any disclaimer, the term of this patent is extended or adjusted under 35 U.S.C. 154(b) by 0 days.

(21) Appl. No.: 17/539,788

(22) Filed: Dec. 1, 2021

(65) Prior Publication Data

US 2022/0176641 A1     Jun. 9, 2022

(30) Foreign Application Priority Data

Dec. 3, 2020  (EP) ..................................... 20211533

(51) Int. Cl.
| | | |
|---|---|---|
| *B29C 65/30* | (2006.01) | |
| *B29C 65/00* | (2006.01) | |
| B29L 23/00 | (2006.01) | |
| H05B 1/02 | (2006.01) | |

(52) U.S. Cl.
CPC .............. *B29C 65/30* (2013.01); *B29C 66/95* (2013.01); *B29L 2023/007* (2013.01); *H05B 1/025* (2013.01)

(58) Field of Classification Search
CPC .................................................... B29C 65/30
See application file for complete search history.

(56) References Cited

U.S. PATENT DOCUMENTS

| | | | | | |
|---|---|---|---|---|---|
| 3,531,695 | A | * | 9/1970 | Bush | H01G 9/22 |
| | | | | | 361/278 |
| 3,596,216 | A | * | 7/1971 | Walsh | H03J 1/066 |
| | | | | | 455/176.1 |
| 3,629,708 | A | * | 12/1971 | Thurnell | H03J 5/0218 |
| | | | | | 455/176.1 |
| 5,254,825 | A | * | 10/1993 | Schippers | B29C 65/04 |
| | | | | | 219/769 |

(Continued)

FOREIGN PATENT DOCUMENTS

| | | | |
|---|---|---|---|
| CN | 102499684 A | * | 6/2012 |
| EP | 0177726 A1 | | 4/1986 |

(Continued)

OTHER PUBLICATIONS

Machine Translation of Chinese Patent 102499684, Date Unknown.*

(Continued)

*Primary Examiner* — Jeffry H Aftergut
(74) *Attorney, Agent, or Firm* — Cook Alex Ltd.

(57) ABSTRACT

A control circuitry (11) comprises an adjustable capacitor (C1), and a bias source (111) configured to apply a bias voltage (V2) to said adjustable capacitor (C1) to adjust a capacitance value of the adjustable capacitor (C1). Such a control circuitry may for example be part of a sealing device (1) to seal a medical tubing (2), the sealing device (1) comprising a receptacle (100) to receive said medical tubing (2), the receptacle (100) comprising an electrode arrangement for causing a heat action on the tubing (2).

10 Claims, 3 Drawing Sheets

(56) References Cited

U.S. PATENT DOCUMENTS 9,859,843 B2 * 1/2018 Charley ............... H03L 7/1075
2011/0313370 A1 12/2011 Smyth

FOREIGN PATENT DOCUMENTS

WO 9534945 A2 12/1995
WO WO-2016/083459 A1 * 6/2016

OTHER PUBLICATIONS

Carroll, Irwin, "Variable-Capacitance Diodes", Electronics World, Jul. 1969.*
Extended European Search Report and Written Opinion issued in connection with EP Pat. Appl. 20 211 533.3 (EP 4 009 744) dated May 20, 2021.

* cited by examiner

CONTROL CIRCUITRY COMPRISING AN ADJUSTABLE CAPACITOR

CROSS-REFERENCE TO RELATED APPLICATION

This application claims the benefit of and priority to European Application No. 20211533.3 filed on Dec. 3, 2020, the disclosure of which is incorporated herein by reference in its entirety.

The invention relates to a control circuitry, to a sealing device to seal a medical tubing and to a method for operating a sealing device to seal a medical tubing.

A control circuitry of the kind described herein may for example be part of a sealing device comprising a receptacle to receive said medical tubing, the receptacle comprising an electrode arrangement for causing a welding action on the tubing. The control circuitry may for example be operatively connected to the electrode arrangement of the receptacle, the control circuitry comprising an adjustable capacitor and a generator device to supply an electrical current to the electrode arrangement.

A sealing device may for example be used to safely seal a tubing which may be used on or together with a medical fluid container, containing for example blood, plasma, platelet, blood component, or any other bodily fluid collection. By means of the sealing device a tubing may be effectively closed, such that a container is sealed in order to allow for a transportation and handling and to prevent a contamination of fluid contained in the container.

It shall be noted, however, that a control circuitry as described herein may be applicable in other devices comprising a capacitor arrangement, such as resonator circuits.

In a sealing device as known from US 2011/0313370 A1 a tubing is received in a receptacle of a handheld tubing sealer, and a safety shield is used together with the tubing sealer in order to shield blood splatter from a user holding the tubing sealer.

WO 2016/083459 A1 describes a plastic tube sealing device comprising a clamp which has a pair of jaws that can move relative to each other for inserting and crimping a plastic tube, the jaws containing high-frequency jaw electrodes, and comprising an electrical power supply circuit including a generator. The plastic tube sealing device further comprises an impedance control circuit for acting towards maintaining an impedance of the power supply circuit constant during a respective welding operation by correspondingly controlling the variable impedance resonant circuit. For this purpose, the generator includes a variable impedance resonant circuit with a capacitor unit and a coil unit. The inductance of the coil unit, the ohmic resistance of the resonant circuit and/or the capacitance of the capacitor unit are variably adjustable.

Generally, for example within a sealing device as concerned herein a sealing of a medical tubing shall be effected by supplying an alternating (RF) current through the electrode arrangement in order to locally heat the tubing and to in this way seal the tubing. For supplying the current to the electrode arrangement, herein, a resonator circuit may be used, the resonator circuit comprising a capacitor which is adjustable in order to match the capacitance of the capacitor to the inductor of the circuit.

In particular in a control circuitry in which the adjusting of the capacitor has to be done manually by a user, the adjusting process may be cumbersome.

In addition, an adjustment may be hard to change during operation. This in particular may have a severe effect if a sealing device shall be used on different medical tubings having e.g. different geometrical dimensions or being made from different materials. For different tubings a capacitance in between electrodes of the electrode arrangement may change, hence requiring an adjusting of the adjustable capacitor, which however may not be easy to do.

Further, during operation the distance between electrodes of the electrode arrangement of the receptacle may change, because the shape of the tubing during welding changes. A change of distance of the electrodes may cause a change in the capacitance, which may in addition affect operation of the sealing device. If the control circuitry electrically changes in its matching conditions during operation, however, an effectiveness of excitation at the electrode arrangement may deteriorate, causing for example longer sealing times.

It is an object of the instant invention to provide a control circuitry, a sealing device and a method for operating a sealing device which, in an easy manner, allow for adjusting an adjustable capacitor, preferably in an automated fashion during operation.

This object is achieved by means of the sealing device according to one or more of the present examples.

Accordingly, the control circuitry comprises a bias source configured to apply a bias voltage to said adjustable capacitor to adjust a capacitance value of the adjustable capacitor.

For example in a sealing device, by means of the adjustable capacitor the control circuitry shall be tuned such that an electrical current can efficiently be supplied to an electrode arrangement to cause a local heating and hence a sealing of the tubing. The capacitor herein is adjustable in its capacitance value by applying a bias voltage to the adjustable capacitor, the bias voltage being applied by a bias source. By means of the bias voltage the capacitance value of the adjustable capacitor can be changed, wherein the capacitance value may assume a maximum value if a bias voltage at 0 or close to 0 is applied to the adjustable capacitance and may be reduced by increasing the bias voltage which is applied to the capacitor.

It has been found that—by applying a bias voltage, in particular a direct current (DC) bias voltage, to a capacitor—its capacitance may be changed. This also is known as the so-called DC-bias effect. In particular, during operation of the control circuitry, when applying an alternating current to the adjustable capacitor and when simultaneously applying a DC bias voltage to the capacitor, the capacitance value of the capacitor may be reduced, dependent on the magnitude of the applied bias voltage, as compared to a situation in which no DC bias voltage is applied.

In common electrical circuits, the DC-bias effect may be unwanted, because it may require the use of a larger capacitor in order to avoid or at least reduce negative effects due to the DC-bias effect. However, in the instant case the DC-bias effect may be used to adjust the capacitance value of the adjustable capacitor, wherein the adjusting can be effected by purely electrical means without any mechanical parts and hence without requiring any mechanical adjustment of capacitor elements. The adjustment of the capacitance value hence may be carried out quickly and efficiently during operation, and may easily be automated by providing a bias source to apply a bias voltage to the adjustable capacitor.

In one embodiment, the bias voltage is a DC voltage. The bias voltage is supplied by the bias source, which in one embodiment is operatively connected to the adjustable capacitor to apply the bias voltage across the capacitor. In particular, different potentials of the bias source may be connected to different terminals of the adjustable capacitor, such that the bias voltage is applied across the capacitor and acts as a (DC) bias overlaying an alternating voltage as caused by the generator device.

In another embodiment, the bias voltage comprises a non-constant, timely variable waveform and hence is not a DC voltage. For example, the bias voltage may have the shape of a saw-tooth waveform, a square wave, a pulse-width modulated (PWM) waveform, an AC waveform or the like.

The bias source in particular may be controllable to adjust the bias voltage. In particular, the control circuitry may comprise a control device to control the bias source, for example in the shape of a microcontroller, which may control the bias source such that the adjustable capacitor is tuned to a capacitance value suitable to match the capacitor to an inductor of the control circuitry, such that a current may efficiently be supplied to the electrode arrangement for causing a welding action on the medical tubing.

The control circuitry may generally be used in any device which uses a capacitor arrangement involving an adjustable capacitor. In particular, the control circuitry may be used in a resonator circuit, for example in a radio, a television, a mobile phone, a satellite or the like, in which an adjustment of for example a resonant frequency takes place by using an adjustable capacitor.

In one embodiment, the control circuitry is part of a sealing device which is configured to seal a medical tubing, the sealing device comprising a receptacle to receive said medical tubing, the receptacle comprising an electrode arrangement for causing a sealing action on the tubing. A control circuitry of the kind described above herein is operatively connected to the electrode arrangement of the receptacle, the control circuitry comprising a generator device to supply an electrical current to the electrode arrangement.

In one embodiment, the electrode arrangement comprises a pair of electrodes arranged to receive the medical tubing therebetween. Via the pair of electrodes an electrical current is fed to the medical tubing, such that the medical tubing is locally heated and hence a welding action is performed on the tubing. The electrodes of the electrode arrangement herein may be mechanically biased towards one another, for example by one or multiple spring elements mechanically acting on one or both of the electrodes, such that the electrodes are held under elastic pretensioning on the tubing and hence receive the tubing in tight contact therebetween.

The electrodes of the electrode arrangement generally act as a capacitor. By means of the control circuitry in particular an alternating (AC) current may be supplied to the electrodes of the electrode arrangement, such current causing a welding action on the tubing such that in particular a sealing of the tubing may be provided.

In one embodiment, the control device, for example in the shape of a microcontroller, is configured to automatically control the bias source based on a measured capacitance value of the electrode arrangement. In particular, in operation of the sealing device, an impedance of the control circuitry may be measured by exciting the control circuitry by applying an alternating voltage signal to the control circuitry and by measuring a resulting current, or vice versa. Such measurement may be performed by the control device during operation of the sealing device automatically, such that a change e.g. in the capacitance of the electrode arrangement may be automatically compensated during operation of the sealing device.

As the control device, for example in the shape of a microcontroller, may perform measurements automatically and may, by suitably controlling the bias source to apply a bias voltage to the adjustable capacitor, match the control circuitry during operation of the sealing device, operation becomes easy for a user, in particular not requiring any change or adjustment for example when using the sealing device to seal tubings of different types.

In one embodiment, the adjustable capacitor is arranged in a circuit path electrically in parallel to the electrode arrangement. The adjustable capacitor hence is placed in parallel to the electrode arrangement.

In addition, the control circuitry may comprise an inductor electrically connected to the adjustable capacitor, the inductor for example being arranged in series with the parallel arrangement of the adjustable capacitor and the electrode arrangement.

In one embodiment, the generator device is configured to supply or excite an AC electrical current to the electrode arrangement in order to provide for a welding action on a tubing received on the receptacle. The generator device may in particular be an RF generator for providing for an RF signal to the control circuitry, for example in a frequency range between 1 kHz and 100 kHz, for example at 10 kHz, but may also be substantially smaller than 1 kHz or substantially larger than 100 KHz.

A system voltage produced by the generator device may be, in one embodiment, an AC voltage, but may also deviate from an AC voltage, such that the RF current fed to the electrode arrangement may have an AC shape or may differ from an AC shape.

The sealing device may in particular be suited to weld medical tubings made from a PVC material. However, the sealing device may also be used on tubings made from other plastic materials in order to provide a welding action on such tubings.

In another aspect, a method to operate a sealing device to seal a medical tubing comprises: receiving said medical tubing in a receptacle, the receptacle comprising an electrode arrangement for causing a welding action on the tubing; supplying an electrical current to the electrode arrangement using a control circuitry operatively connected to the electrode arrangement of the receptacle, the control circuitry comprising an adjustable capacitor and a generator device; and applying, using a bias source of the control circuitry, a bias voltage to said capacitor to adjust a capacitance value of the capacitor.

The advantages and advantageous embodiments as described above for the sealing device equally apply also to the method, such that it shall be referred to the above in this respect.

The idea underlying the invention shall subsequently be described in more detail with respect to the embodiments shown in the figures. Herein, FIG. 1 shows an example of a sealing device for receiving a medical tubing;

Figure 1:
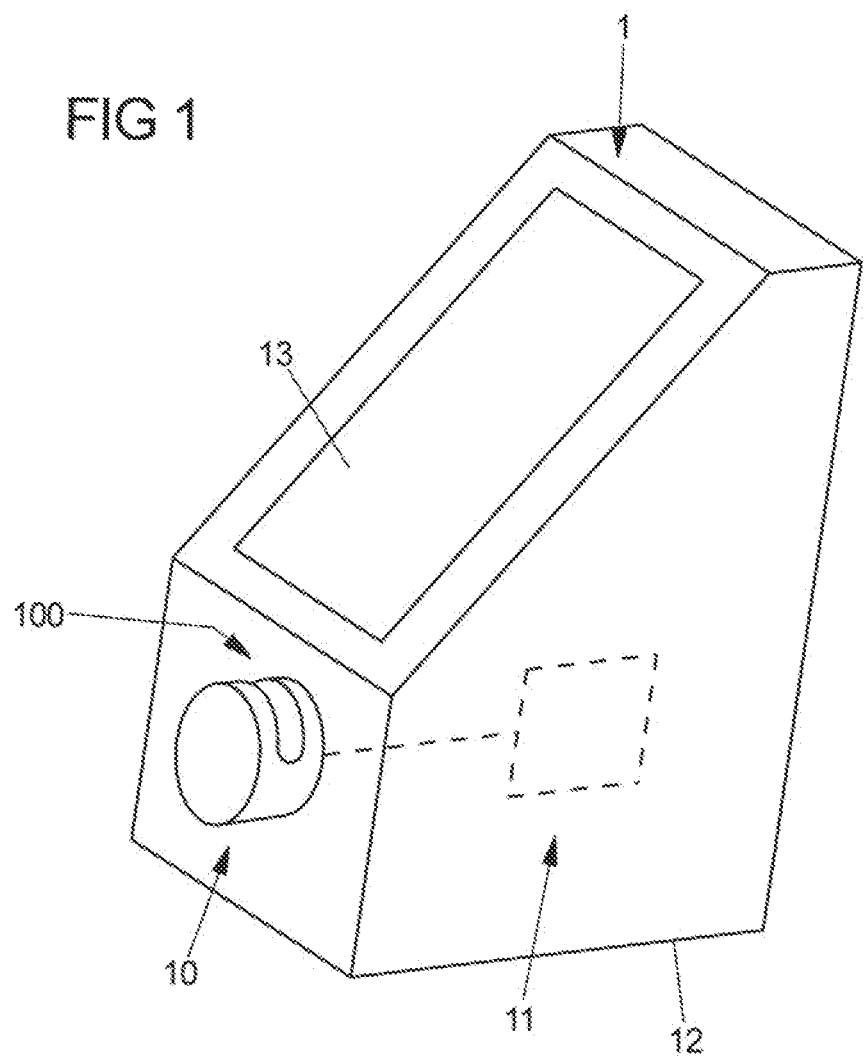

FIG. 1 shows, in a schematic drawing, an embodiment of a sealing device 1 serving to seal a medical tubing, such as PVC tubing, by welding. The sealing device 1 may in particular be used to seal a tubing used with medical containers, such as containers containing blood, plasma, platelet, blood component or another body fluid collection. By means of the sealing of a tubing a container may be prepared for transportation and handling, and contamination of contents of the container may be prevented.

The sealing device 1, as shown in FIG. 1, comprises a housing 12 and a sealing element 10 arranged on the housing 12. The sealing element 10 forms a receptacle 100, in which a tubing may be received in order to seal the tubing by welding.

The sealing element 10 is in operative connection with a control circuitry 11, which may be embodied to supply an alternating (RF) current to the sealing element 10 in order to provide for a sealing action on a tubing received in the receptacle 100, as shall be explained further below.

A display 13 may be arranged on the housing 12, the display 10 allowing for example to output information concerning a sealing process or to enter control commands.

Figure 2:
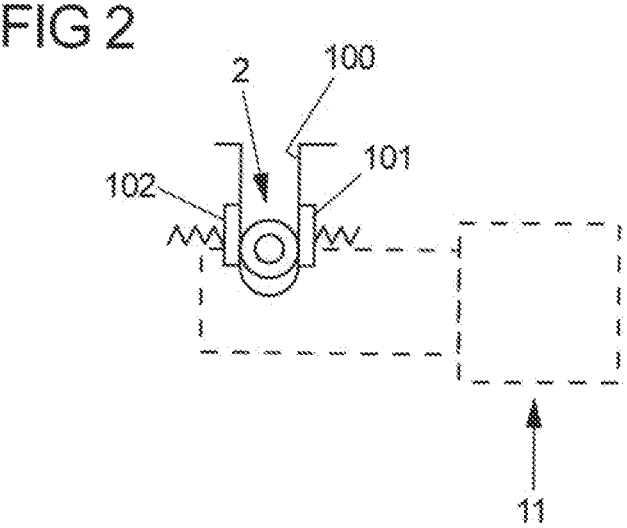
FIG. 2 shows a schematic drawing of a receptacle of the sealing device.

Referring now to FIG. 2, the receptacle 100 in one embodiment comprises an electrode arrangement having, for example, a pair of electrodes 101, 102, which are arranged and configured to receive a tubing 2 therebetween such that, when the tubing 2 is placed in the receptacle 100, the tubing 2 is tightly held in between the electrodes 101, 102. The electrodes 101, 102 may for example be elastically biased, for example using mechanical spring elements, such that the tubing 2 is held in between the electrodes 101, 102 under an elastic pretensioning, ensuring a tight contact in between the electrodes 101, 102 and the tubing 2 therebetween.

As further visible from FIG. 2, the electrodes 101, 102 are in operative connection with the control circuitry 11, such that a supply current may be fed to the electrodes 101, 102 to perform a welding action on the tubing 2.

Figure 3:
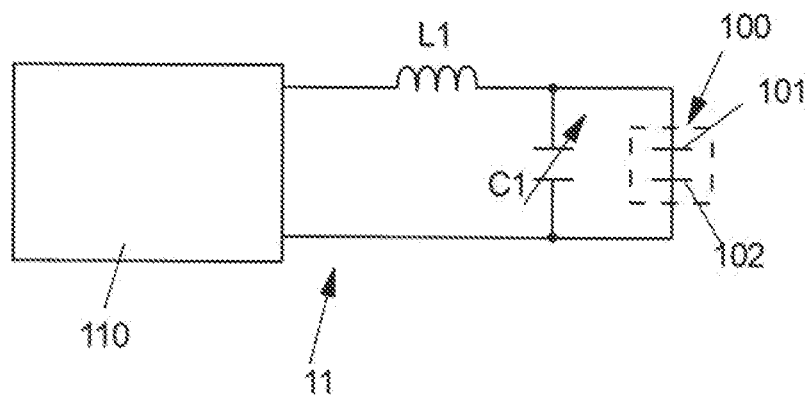
FIG. 3 shows a schematic drawing of a control circuitry of the sealing device.

Referring now to FIG. 3, the control circuitry 11 in one embodiment comprises a generator device 110 in the shape of an RF generator, which is connected to the electrode arrangement of the receptacle 100 by means of a resonator circuit formed by an inductor L1 and a capacitor C1. The electrodes 101, 102 of the electrode arrangement of the receptacle 100 form a capacitance C2, which is arranged electrically in parallel to the capacitor C1, the inductor L1 being arranged in series to the parallel arrangement of the capacitor C1 and the electrode arrangement of the receptacle 100.

In operation, an alternating (RF) current is excited by means of the RF generator 110, the current being supplied to the electrode arrangement of the receptacle 100, such that a local heating and hence a welding of a tubing received on the receptacle 100 is caused.

To be able to efficiently supply an alternating current to a tubing received on the receptacle 100 for delivering welding energy to the tubing, the capacitance of the capacitor C1 should be matched to the inductance of the inductor L1. For this, the capacitor C1 is adjustable in its capacitance value, such that the capacitor C1 may be tuned in order to provide for an efficient (resonant) operation of the control circuitry 11.

In order to provide for an easy circuitry which may be operated in an automated fashion to adjust the capacitance value of the capacitor C1, it herein is proposed to adjust the capacitor C1 by applying a (DC) bias voltage to the capacitor C1 in order to cause a change of capacitance based on the so-called the DC-bias effect.

Generally, if a DC bias voltage is applied to a capacitor while at the same time applying an alternating (AC) signal to the capacitor, the capacitance of the capacitor is varied in dependence on the value of the applied bias voltage. In particular, with increasing bias voltage the capacitance may be reduced, as this is shown qualitatively in an example in FIG. 4, showing a change in capacitance (dC/C, in percent) on the vertical axis for different applied bias voltages as noted on the horizontal axis.

Figure 4:
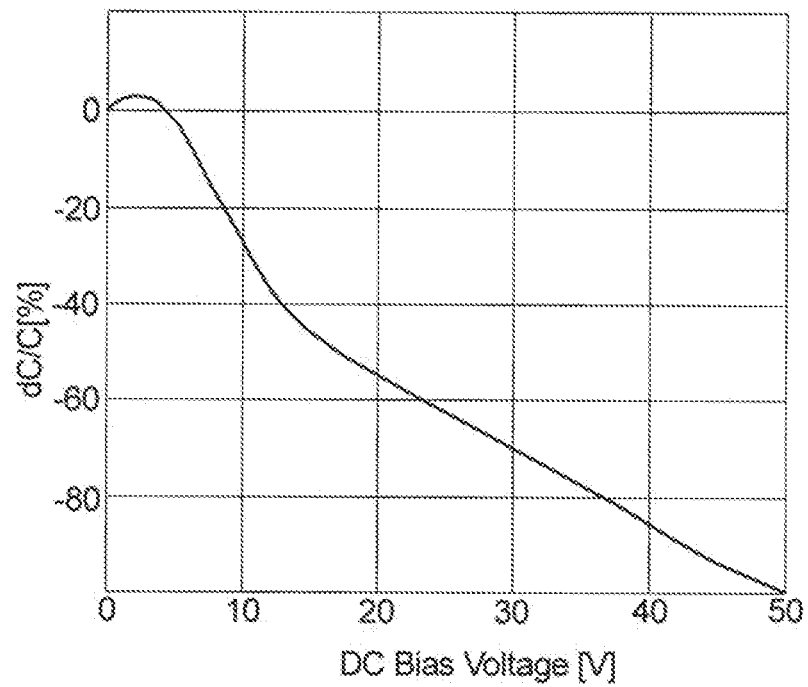
FIG. 4 shows a graph of a change in the capacitance as a function of an applied DC bias voltage.

As visible from FIG. 4, in certain examples, by applying a suitable bias voltage a capacitance of the capacitor may be substantially reduced, e.g. by more than 80%.

Figure 5:
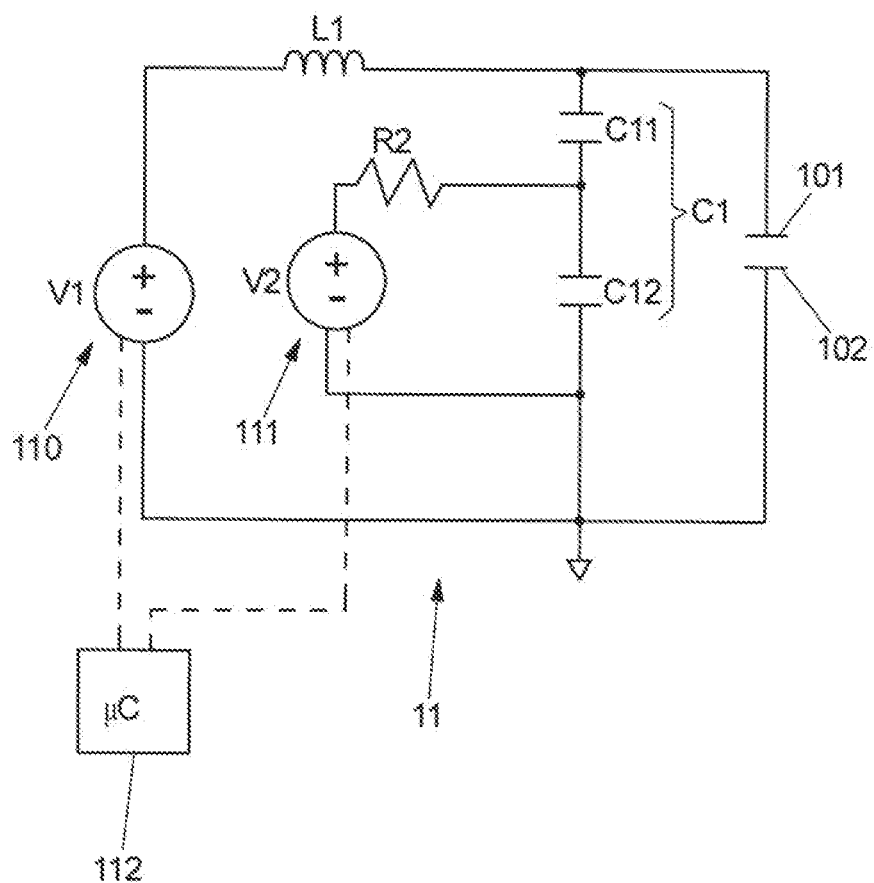
FIG. 5 shows a schematic circuit diagram of a control circuitry comprising an adjustable capacitor and a bias source for applying a bias voltage to the adjustable capacitor for adjusting a capacitance value of the adjustable capacitor.

This is used herein to adjust the capacitance of the capacitor C1 by applying a bias voltage V2 using a bias source 111, as this is shown in one embodiment in FIG. 5.

In the embodiment of FIG. 5, the capacitor C1 is divided into two capacitors C11, C12 arranged in series, wherein the bias voltage V2 is applied by the bias source 111 to terminals of the capacitor C12 to adjust the capacitance of the capacitor C12. The bias source 111 herein is connected to the capacitor C12 via a resistor R1 to apply the bias voltage V2 across the capacitor C12.

During operation, the control circuitry 11 is excited by applying an alternating (RF) voltage V1 by means of the generator device 110 in order to supply an alternating (RF) current to the electrodes 101, 102 of the electrode arrangement of the receptacle 100. The generator device 110 as well as the bias source 111 herein are controlled by a control device 112 in the shape of a microcontroller, the control device 112 in particular being configured to tune the capacitance value of the capacitor C12 during operation of the sealing device 1.

For this, the control device 112 may be configured to measure a resulting impedance of the control circuitry 11 during operation and to adjust the capacitor C12 to control the bias voltage V2 in order to suitably match the overall capacitance to the inductor L1.

Accordingly, a manual tuning of the capacitor C1, C12 is not necessary. The adjustment of the capacitor C1, C12 may be automated and thus may be performed automatically during operation of the sealing device 1 by the control device 112 in the shape of the microcontroller.

In particular, if during operation the electrodes 101, 102 of the receptacle 100 change their position with respect to one another, due to a welding action on a tubing 2, as shown in FIG. 2, a change in capacitance of the electrode arrangement of the receptacle 100 may be automatically compensated by adjusting the capacitance value of the capacitor C1, C12.

In addition, the sealing device 1 may be used together with different types of tubing, in particular tubing made from a PVC material as well as tubing made from another material and of different geometric dimensions, without having to take special measures to adjust the control circuitry 11 of the sealing device 1. Rather, during operation the control circuitry 11 may automatically be adjusted for providing for a sealing action on the tubing received in the receptacle 100 by suitably tuning the capacitor C1 in an automated, controlled fashion.

The embodiments as described herein are not to be understood as limiting for the invention. Rather, the invention may be implemented also in an entirely different fashion.

The sealing device may be stationary, a tubing having to be placed on a sealing element to perform a welding action on the tubing.

In another embodiment, the sealing device may be a handheld device, such that a user may place the sealing device on a tubing in order to perform a welding action on the tubing.

Although described above with reference to an embodiment of a sealing device, it shall be noted that a control circuitry as concerned herein may generally be part of any device which employs a capacitor arrangement including an adjustable capacitor, such as a device comprising a resonator circuit. For example, a control circuitry as described herein may generally be used in electronic devices such as a radio, a television, a mobile phone, or a satellite or in other devices including a resonator circuit.

LIST OF REFERENCE NUMERALS

1 Sealing device
10 Sealing element
100 Receptacle
101, 102 Electrode elements
11 Control circuitry
110 RF generator device
111 Bias source
112 Control device (microcontroller)
12 Housing
13 Display
2 Medical tubing
C1, C2 Capacitor
C11, C12 Capacitor
L1 Inductor
R1 Resistance
V1 Voltage
V2 Bias voltage

The invention claimed is:

1. Method to operate a sealing device (1) to seal a medical tubing (2), comprising:
   receiving said medical tubing (2) in a receptacle (100), the receptacle (100) comprising an electrode arrangement for causing a welding action on the tubing (2), and
   supplying an alternating electrical current to the electrode arrangement using a control circuitry (11) operatively connected to the electrode arrangement of the receptacle (100), the control circuitry (11) comprising an adjustable capacitor (C1) and a generator device (110), characterized by applying, using a bias source (111) of the control circuitry (11), a DC bias voltage (V2) to said capacitor (C1), and using the generator device, the alternating electrical current to said capacitor, to adjust a capacitance value of the capacitor (C1) by a DC-bias effect.

2. Sealing device (1) to seal a medical tubing (2), comprising a receptacle (100) to receive said medical tubing (2), the receptacle (100) comprising an electrode arrangement for causing a welding action on the tubing (2), and
   a control circuitry (11) comprising an adjustable capacitor (C1) and a bias source (111) configured to apply a DC bias voltage (V2) to said adjustable capacitor (C1) to adjust a capacitance value of the adjustable capacitor (C1), the control circuitry (11) being operatively connected to the electrode arrangement of the receptacle (100), the control circuitry (11) comprising a generator device (110) to supply an alternating electrical current to the electrode arrangement,
   wherein the alternating electrical current and DC bias voltage are simultaneously applied to the adjustable capacitor to adjust the capacitance value of the adjustable capacitor.

3. Sealing device (1) according to claim 2 wherein the bias source (111) is operatively connected to said adjustable capacitor (C1) to apply the bias voltage (V2) across the adjustable capacitor (C1).

4. Sealing device (1) according to claim 2 wherein the bias source (111) is controllable to adjust the bias voltage (V2).

5. Sealing device (1) according to claim 2, wherein the electrode arrangement comprises a pair of electrodes (101, 102) arranged to receive said medical tubing (2) therebetween.

6. Sealing device (1) according to claim 2 wherein the control circuitry (11) comprises a control device (112) to control the bias source (111).

7. Sealing device (1) according to claim 6, wherein the control device (112) is configured to automatically control the bias source (111) based on a measured capacitance value of the electrode arrangement.

8. Sealing device (1) according to claim 2 wherein the adjustable capacitor (C1) is arranged in a circuit path electrically in parallel to the electrode arrangement.

9. Sealing device (1) according to claim 2 wherein the control circuitry (11) comprises an inductor (L1) electrically connected to the adjustable capacitor (C1).

10. Sealing device (1) according to claim 2 wherein the tubing (2) is a PVC tubing.

* * * * *